(No Model.) 3 Sheets—Sheet 3.
F. M. LEAVITT.
MACHINE FOR MOLDING PLASTIC MATERIAL.
No. 558,500. Patented Apr. 21, 1896.
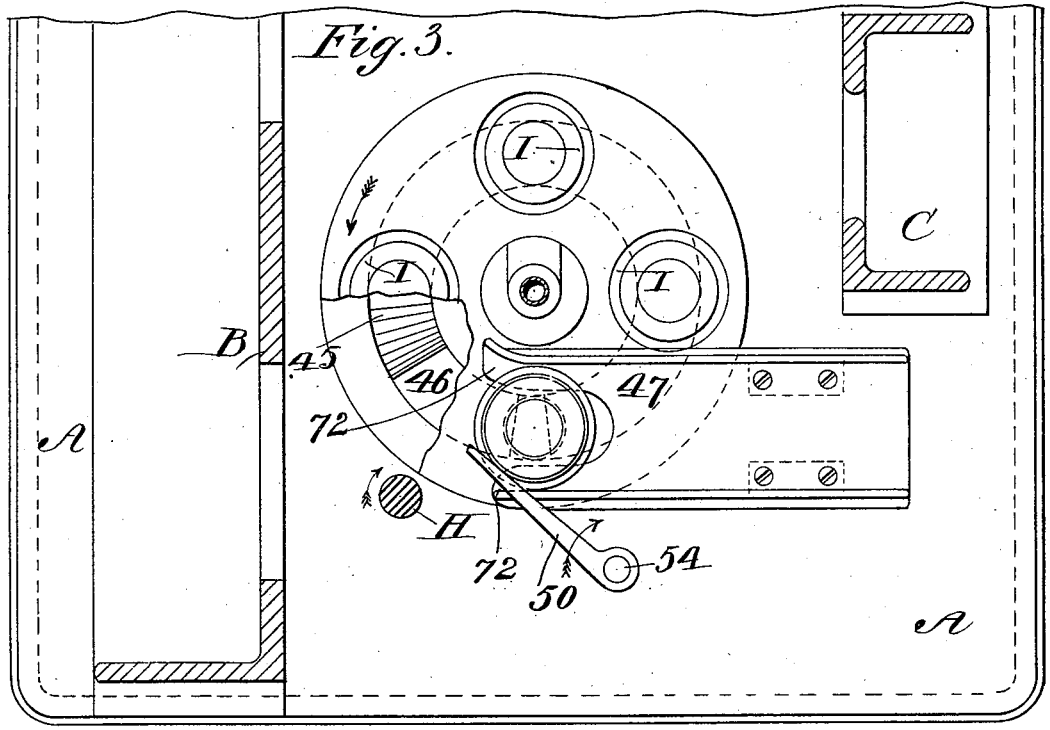
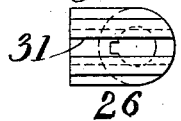
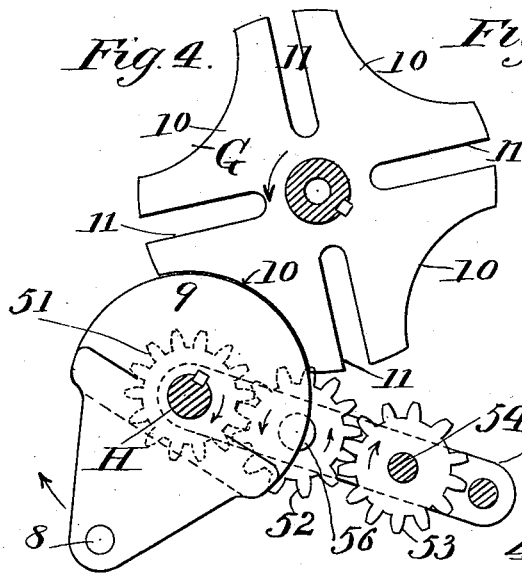
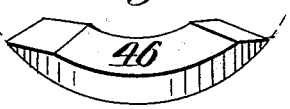
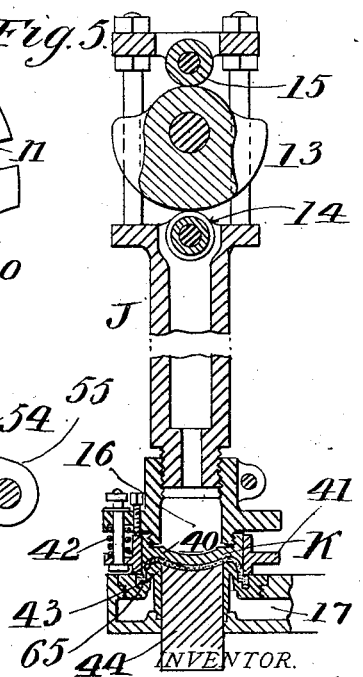
WITNESSES:
INVENTOR.
Frank M. Leavitt
BY Henry F. Parker,
ATTORNEY.

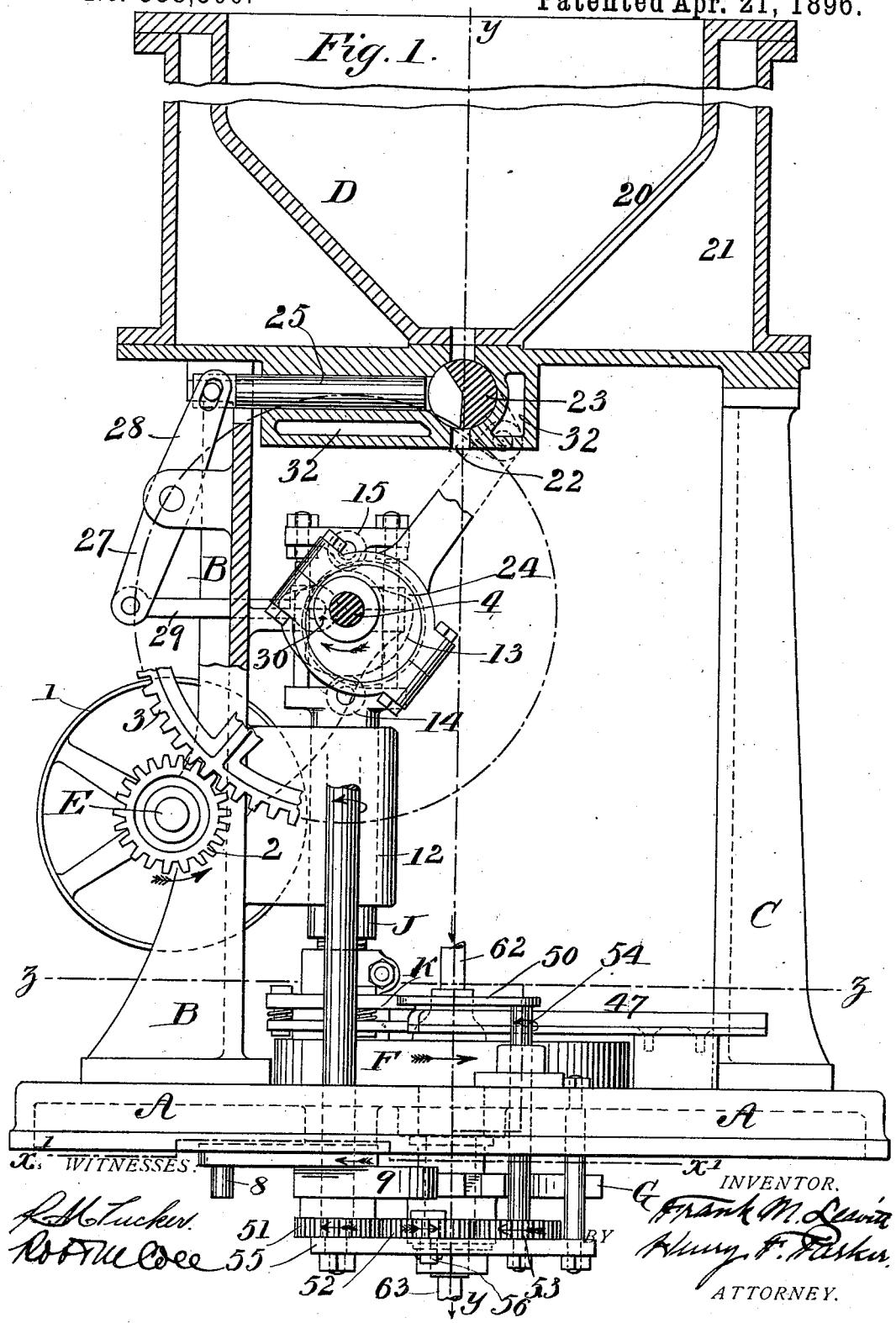

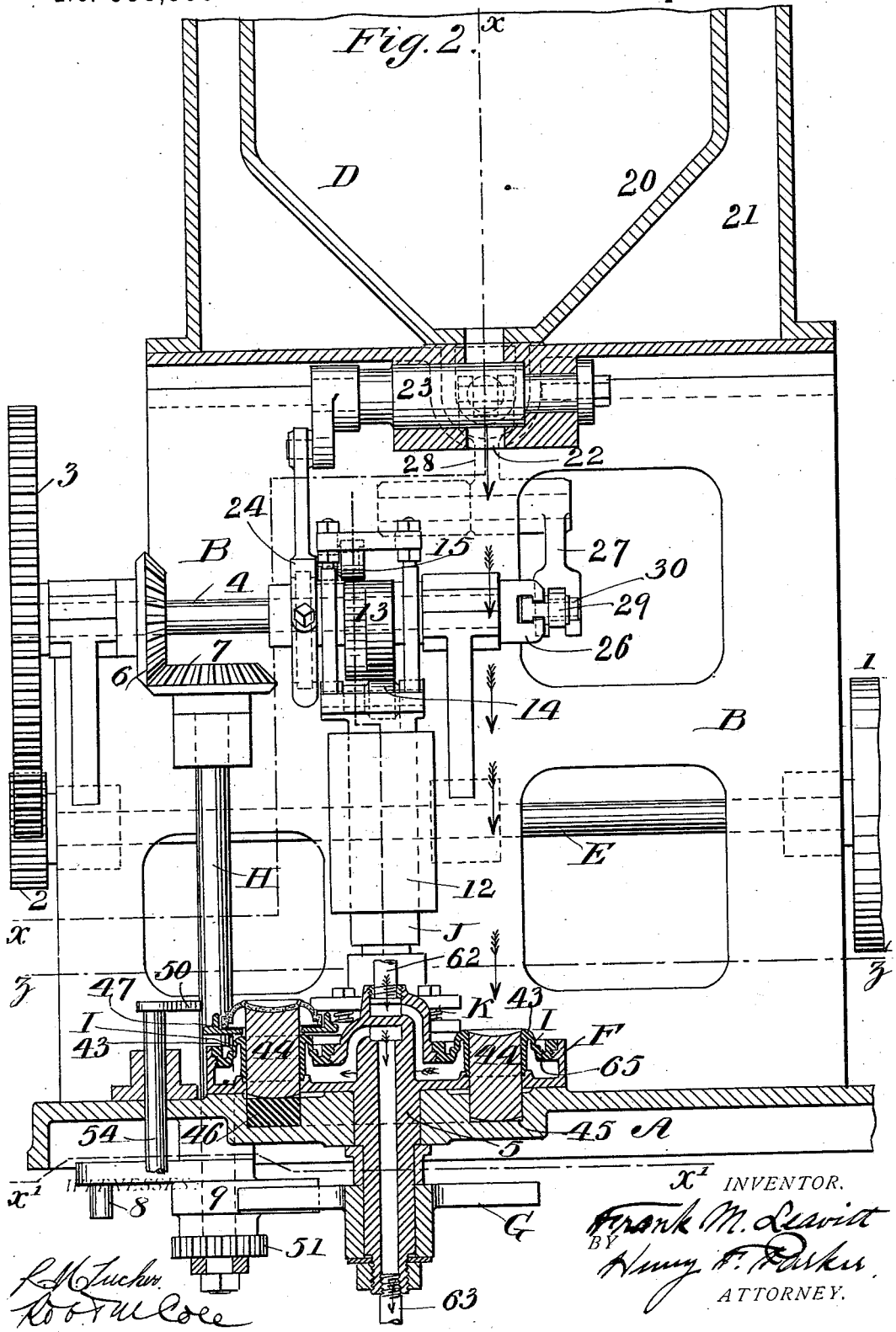

UNITED STATES PATENT OFFICE.

FRANK M. LEAVITT, OF BROOKLYN, NEW YORK, ASSIGNOR TO HALLACK A. PENROSE, OF BALTIMORE, MARYLAND.

MACHINE FOR MOLDING PLASTIC MATERIAL.

SPECIFICATION forming part of Letters Patent No. 558,500, dated April 21, 1896.

Application filed July 16, 1895. Serial No. 556,201. (No model.)

*To all whom it may concern:*

Be it known that I, FRANK M. LEAVITT, a citizen of the United States, and a resident of Brooklyn, in the county of Kings and State of New York, have invented certain new and useful Improvements in Machines for Molding Plastic Material, of which the following is a specification.

This invention is adapted for the manufacture of articles compressed from plastic material which is required to remain for a period in the mold after compression in order to solidify; and said invention is especially adapted to the manufacture of composition targets.

The object of the invention is to mold the articles with rapidity and uniformity, and give ample time for solidifying them before they are ejected from the molds, while the mechanism, in the nature of its construction, may be concentrated, and operates uninterruptedly.

The invention consists in a molding-press embodying a rotary turret containing a series of dies, and a composition feeding device above one part of the turret, and a compressing-plunger above another part of the turret, and in certain novel combinations of mechanism for automatically operating the turret and the feeding device and the plunger in proper relation to one another, and for ejecting and removing the finished articles from the dies.

In order to enable others skilled in the art to which my invention appertains to understand and use the same, I will proceed to describe suitable details of construction adapted for carrying the said invention into practice, explain its operation, and subsequently point out in the appended claims its novel characteristics.

Referring to the accompanying drawings, in which similar characters of reference indicate corresponding parts throughout the several views, Figure 1 is a side elevation taken partly in section on the line $xx$, Fig. 2. Fig. 2 is a front sectional elevation taken on the line $yy$, Fig. 1. Fig. 3 is a sectional plan view taken at line $zz$, Figs. 1 and 2. Fig. 4 is a sectional plan view taken at line $x'x'$, Figs. 1 and 2. Fig. 5 is a sectional elevation of the compressing-plunger and adjacent parts. Fig. 6 is a detail face view of the actuating-crank for the feed device. Fig. 7 is a detail view of the ejector-cam.

On the bed-plate A is mounted the upright main frame B and auxiliary pedestal C, each supporting the kettle D.

E is the drive-shaft, having a belt-pulley 1 and pinion 2 geared to a spur-wheel 3 on a cam-shaft 4.

F is a turret revolving on its pintle 5, resting firmly on the surface of the bed A, and having four or other suitable number of dies I, and carrying underneath the bed a Geneva-stop wheel G, having points of stoppage corresponding to each die I.

A vertical shaft H is miter-geared to the shaft 4 by gears 6 and 7, and carries on its lower end a revolving tooth-pin 8 and locking-segment 9, engaging with the stop-wheel G in a manner which will be clearly understood from an inspection of Fig. 4. During about three-fourths of the revolution of the shaft H the locking-segment 9 engages with a recess 10 of the stop-wheel G, and during about one-fourth of the revolution of the shaft H the tooth-pin 8 engages with a slot 11 in the stop-wheel G.

The plunger J slides in a bracket 12 and carries a suitable die K, and is reciprocated by means of a cam 13 on the shaft 4, which cam engages with the rollers 14 15 in the cage attached to the top of the plunger. The cam 13 is so contoured as to suspend the plunger at its raised position during about one-fourth of the revolution of the shaft 4 and at the remaining parts of the revolution to depress the plunger, allow a prolonged dwell, and raise the plunger.

The miter-gears 6 and 7 are equal, and the motions of the plunger J and turret F are so timed by the adjustment of the above-described mechanism that the turret shall revolve one-quarter of a revolution during the quarter-revolution of the shaft 4, at which the plunger is suspended, bringing a new die I into coincidence with the plunger, and that the turret F shall remain stationary in its locked position during the remaining three-quarters of the revolution of the shaft 4, pending the descent, dwell, and ascent of the plunger. The long dwell of the plunger permits the thorough setting of the composition in the dies. In order to keep the dies cool and hasten the setting of the material, suitable cold-water-circulating cavities 16 and 17 are provided in the plunger J and turret F, having suitable connections, such as 62 63, for supply and discharge.

The kettle D is composed of an inner shell 20 and a steam-heating jacket 21, and the tank has its outlet 22 vertically alined with one of the dies I at a point of stoppage immediately preceding that which is under the ram J. The outlet 22 is intercepted by a rocking valve 23, worked by an eccentric 24 on the shaft 4, through which the material is drawn and ejected by means of a feed-plunger 25, worked by a crank 26, through the rock-arms 27 28 and connecting-rod 29, which has its pin 30 radially adjustable in the slot 31 of the crank 26 (see Fig. 6) to adjust the feed to deliver exactly the proper amount of material. Steam is admitted into the cavities 32 to keep the material warm and plastic until delivered.

The die K consists of a fixed concave part 40 and a movable annular part 41, which is forced down by springs 42. Each die I is composed of a fixed convex part 43, surrounded by an annular channel 65, and a movable central part 44, which latter serves as an ejector. The construction of dies shown corresponds to that described and claimed in Letters Patent of the United States No. 513,527, granted January 30, 1894, for molding composition targets.

A novel feature herein consists in the means for actuating the ejectors 44. These ejectors project into a circular groove 45 in the bed A, into which is fastened a cam-segment 46, so located as to raise each ejector at the proper time when passing away from the plunger J by the revolution of the turret F. The finished bird or other article is thereby raised out of the die I, and received by the trough 47, which is forked at 72, for the purpose of admitting the raised ejector. After the ejector enters the fork 72 it drops over the end of the cam 46, depositing the bird or article on the fork. A carrier-arm 50 rotates so as to sweep over the trough 47 and feed the birds or articles from the fork end of the sluice toward its delivery end whence the products are removed by hand or dropped on a drying-belt, or otherwise disposed of. The carrier-arm 50 is continuously revolved (or may be given an intermittent swinging motion) once for each revolution of the shaft H by means of a train of gearing 51 52 53, the extreme members of which are mounted one upon the shaft H and the other upon the shaft 54 of said carrier-arm, and the intermediate member of which is mounted upon a stud 56 upon the bar 55.

The operation of the machine is as follows: The shafts and rotary parts severally revolve in the directions indicated by arrows, receiving their motion from the driving-pulley 1. The eccentric 24 rocks the valve 23 to establish communication between the kettle and the plunger 25, which is then retracted by the crank 26, drawing a charge of the heated composition. The valve 23 being next reversed, the ejecting motion of the plunger 25 delivers the proper amount of material, which drops upon the mold I, which is vertically beneath the outlet 22, the concave face 66 of the ejector 44 and the annular channel 65 of the die I retaining the composition until the finger 8 has entered one of the slots 11 of the turret stop-wheel and swung the said die I under the plunger. The descent of the plunger J follows, and the ring 41 striking the lower die first confines the material during the descent of the crown 40 of the upper die, which performs the compression, and the dwell of the plunger during about one-half of the revolution of the shaft 4 allows the composition to become set by the cooling effect of the cold-water circulation in the cavities 16 and 17. As the plunger rises the finger 8 enters a succeeding slot 11 in the stop-wheel G, and the revolution of the turret carries the ejector 44 over the segmental cam 46, lifting the bird or article 70 out of the mold I, so that its flange 71 is carried over the fork 72 and lodged thereon by the dropping of the ejector 44. The carrier 50 immediately follows, carrying the product through the trough 47 to its delivery.

Having thus fully described my invention, what I claim, and desire to secure by Letters Patent, is—

1. In a machine for molding plastic material, the combination of a rotary turret containing a series of dies, a plunger above the turret carrying a corresponding die, a receptacle and a feed device also above the turret for supplying the material in measured quantities, ejectors in the dies, a stationary cam beneath the turret acting on said ejectors to lift and drop them when the turret is revolved, a trough adjacent to and above the turret having a forked receiving end into which said ejectors pass and then drop, and a carrier for removing the deposited articles, substantially as described.

2. In a machine for molding plastic material, the combination of a movable part containing a die, an ejector in the die, means for lifting the ejector and raising the article from the surface of the die, and a receiving-trough underlying the path of the article when raised, and means for dropping the ejector and depositing the article on the trough by the movement of said ejector.

3. In a machine for molding plastic material, the combination of a movable part containing a die, an ejector in the die, means for lifting the ejector and raising the article from the surface of the die, and a receiving-trough underlying the path of the article when raised, and means for dropping the ejector and depositing the article on the trough by the movement of said ejector, and a carrier for feeding the articles along the trough after they are deposited.

4. In a machine for molding plastic material, the combination of a rotary turret containing a series of dies on one face, means for supplying and compressing the material, ejectors in the dies, a stationary cam opposite the other face of the turret acting on said ejectors to lift and drop them when the turret is revolved, a trough adjacent to the die-face of the turret having a forked receiving end into which said ejectors pass and then drop, and a carrier for removing the deposited articles, substantially as described.

5. In a machine for molding plastic material, the combination of a rotary turret containing a series of dies on its upper face, means for supplying and compressing the material, ejectors in the dies consisting of vertically-movable plungers projecting through the turret, a circular channel in the frame of the machine beneath the turret in which the lower ends of the ejectors travel and are supported in their normal position, and a cam in said channel for lifting the ejectors at a certain part of the rotation of the turret, and suitable means for removing the molded articles when the ejectors are lifted.

Signed at Brooklyn, in the county of Kings and State of New York, this 17th day of May, A. D. 1895.

FRANK M. LEAVITT.

Witnesses:
H. M. DOMBAUGH,
JOHN HUBBARD.